United States Patent [19]
Koizumi

[11] Patent Number: 5,448,647
[45] Date of Patent: Sep. 5, 1995

[54] ELECTRIC APPARATUS HAVING SPEAKER

[75] Inventor: Hiroshi Koizumi, Saitama, Japan

[73] Assignee: Sony Corporation, Tokyo, Japan

[21] Appl. No.: 120,258

[22] Filed: Sep. 10, 1993

[30] Foreign Application Priority Data

Sep. 18, 1992 [JP] Japan .................................. 4-249894

[51] Int. Cl.6 .............................................. H04R 1/02
[52] U.S. Cl. ........................................ 381/90; 381/88;
381/188; 381/205; 381/24
[58] Field of Search ......................... 381/24, 88, 89, 90,
381/188, 205; 348/836, 839, 552, 554, 725, 738;
H04N 5/640

[56] References Cited

U.S. PATENT DOCUMENTS

| | | | |
|---|---|---|---|
| 4,031,318 | 6/1977 | Pitre | 381/90 |
| 4,058,675 | 11/1977 | Kobayashi et al. | |
| 4,847,904 | 7/1989 | McShane | 381/90 |
| 5,181,247 | 1/1993 | Holl | 381/89 |

FOREIGN PATENT DOCUMENTS

| | | |
|---|---|---|
| 0372186 | 6/1990 | European Pat. Off. . |
| 57-197996 | 4/1982 | Japan . |
| 62-281698 | 7/1987 | Japan . |
| 1-60160 | 3/1989 | Japan . |
| 2102243 | 6/1981 | United Kingdom .................. 381/24 |
| 2239763 | 7/1991 | United Kingdom . |

Primary Examiner—Forester W. Isen
Attorney, Agent, or Firm—Lise A. Rode; Robert P. Biddle; Jerry A. Miller

[57] ABSTRACT

A speaker system comprising a speaker housing detachable from the body of the television receiver, the detachable speaker housing having first and second sides; a low frequency component speaker disposed in a lower portion of the first side of the detachable speaker housing; and, two high frequency component speakers, wherein a first of the two high frequency component speakers is disposed in an upper portion of the first side of the detachable speaker housing and a second of the two high frequency component speakers is disposed in a lower portion of the second side of the detachable speaker housing.

2 Claims, 5 Drawing Sheets

FIG. 5
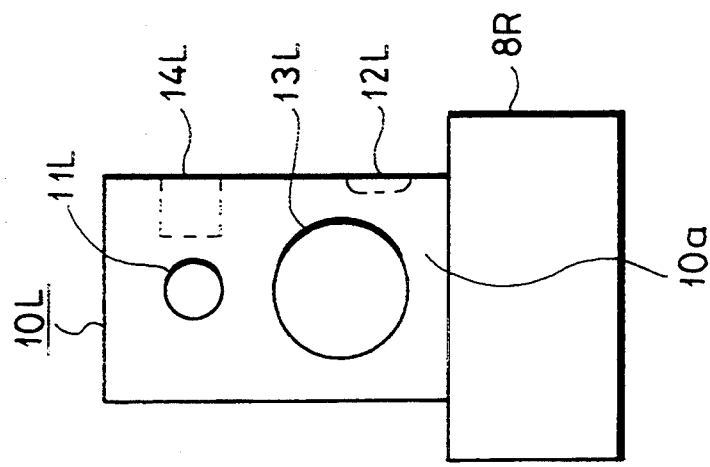
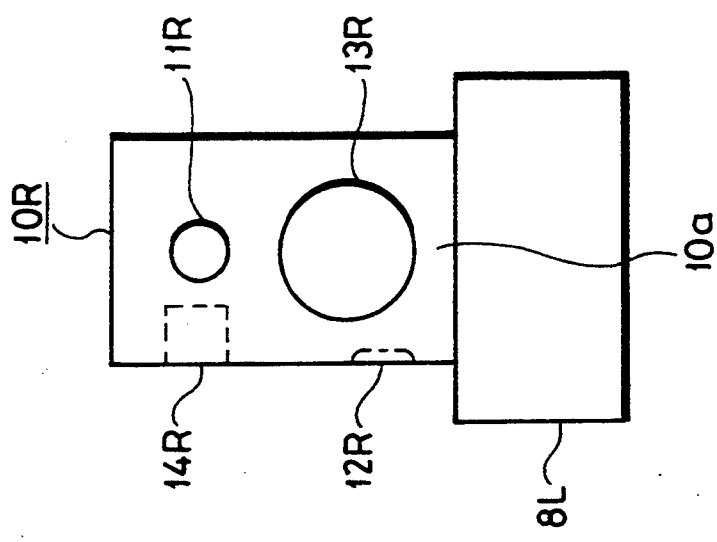

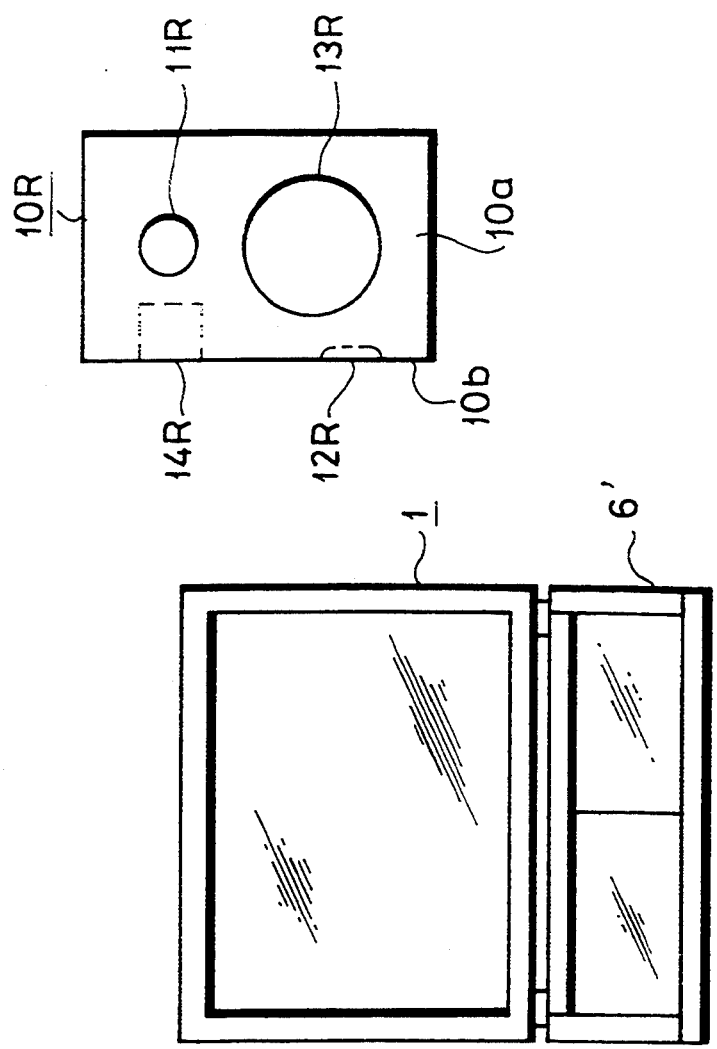
FIG. 6
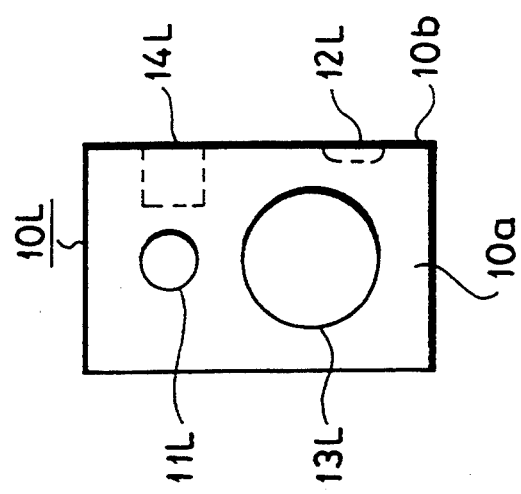

5,448,647

ELECTRIC APPARATUS HAVING SPEAKER

BACKGROUND OF THE INVENTION

1. Field of the Invention

The present invention generally relates to electric apparatus having a speaker and, more particularly, is directed to a speaker for a television receiver.

2. Description of the Related Art

Television receivers having speakers integrally incorporated therein are now commercially available on the market. It is customary that, when the viewer watches a television broadcast program with a television receiver, the viewer watches the television broadcast program with a sound reproduced from the incorporated speaker. In this case, a small speaker is housed within the television receiver so that a sound with relatively high tone quality can be reproduced.

Recently, it has been requested to reproduce sound with excellent tone quality when the viewer watches a television broadcast program or video program reproduced from a video tape. Therefore, there is a trend that television receivers incorporate large speakers therein.

It is natural that the television receiver having the large speaker becomes large in size and needs a large space to accommodate same. If there is a little space to spare to install the television receiver, then it is considered that a television receiver is combined with a separate large speaker apparatus. In that case, the speaker housed within the television receiver becomes useless.

OBJECTS AND SUMMARY OF THE INVENTION

Therefore, it is a general object of the present invention to provide an improved speaker for a television receiver in which the aforesaid shortcomings and disadvantages encountered with the prior art can be eliminated.

More specifically, it is an object of the present invention to provide a speaker for a television receiver in which sound can be reproduced with excellent tone quality.

It is another object of the present invention to provide a speaker for a television receiver which can be disposed in a small space when attached to a television receiver.

According to an aspect of the present invention, there is provided a speaker system for a television receiver having a speaker housing detachable from a television receiver body, tweeter said detachable speaker housing having speaker disposed on two different sides of the housing to reproduce a sound of a high frequency component, and a woofer speaker disposed on one of the two sides in which the tweeter speakers are disposed to reproduce a sound of a low frequency component.

According to another aspect of the invention, there is provided a speaker system comprising a speaker housing detachable from the body of the television receiver, the detachable speaker housing having first and second sides; a low frequency component speaker disposed in a lower portion of the first side of the detachable speaker housing; and, two high frequency component speakers, wherein a first of the two high frequency component speakers is disposed in an upper portion of the first side of the detachable speaker housing and a second of the two high frequency component speakers is disposed in a lower portion of the second side of the detachable speaker housing.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 5 is a front view showing a second example that the speaker according to the embodiment of the present invention is disposed; and FIG. 6 is a front view showing a third example that the speaker according to the embodiment of the present invention is put in position.

DETAILED DESCRIPTION OF THE PREFERRED EMBODIMENT

A speaker for a television receiver according to an embodiment of the present invention will hereinafter be described with reference to the drawings.

Figure 1:
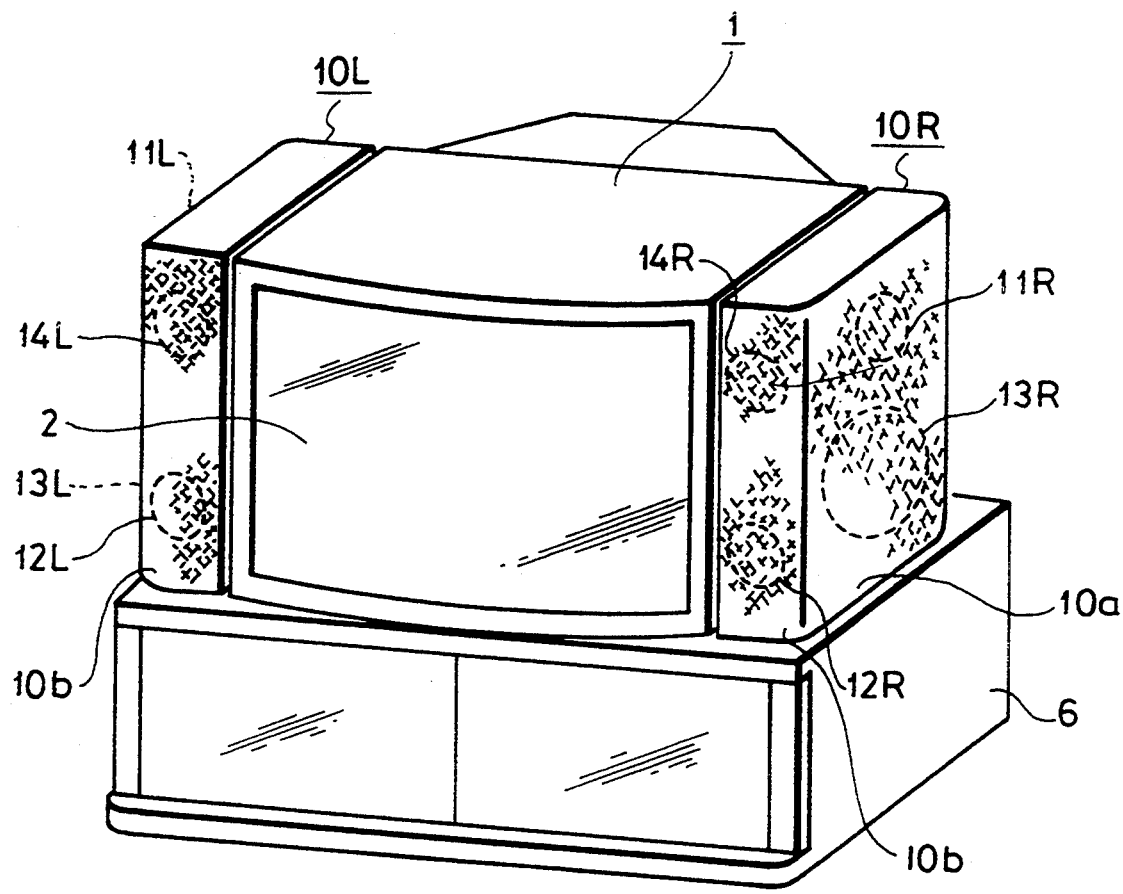
FIG. 1 is a perspective view showing a speaker for a television receiver according to an embodiment of the present invention.

FIG. 1 of the accompanying drawings is a perspective view and showing the condition that a speaker apparatus according to the embodiment of the present invention is attached to the television receiver.

Figure 2:
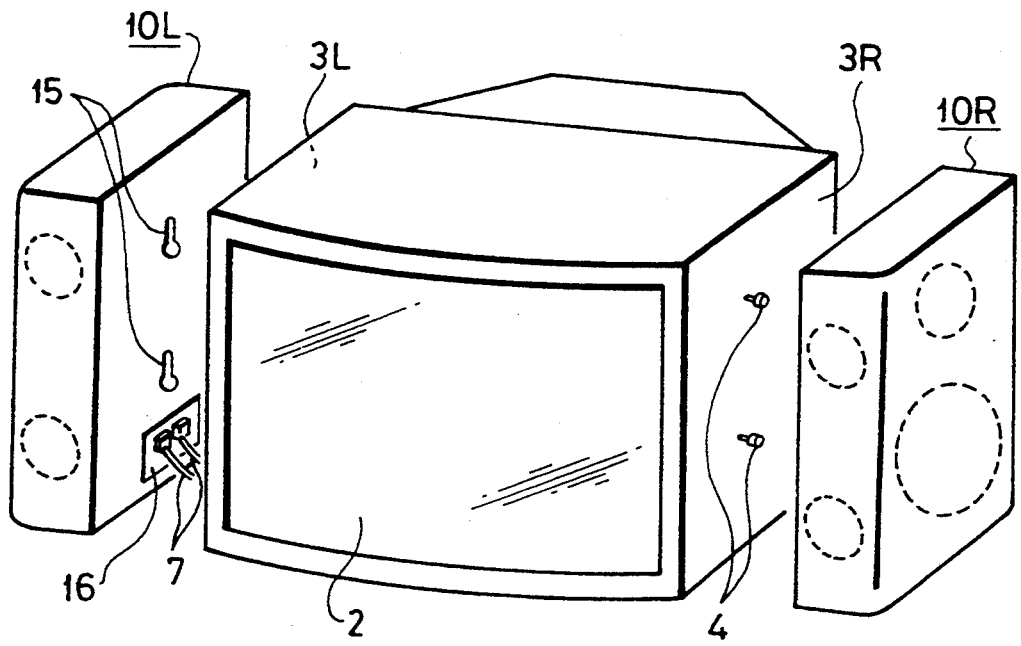
FIG. 2 is a perspective view showing the condition that the speaker according to the embodiment of the present invention is removed from the television receiver.

As shown in FIG. 1, a television receiver body that is generally depicted by reference numeral 1 includes on its front wall an image display portion 2 formed of a cathode ray tube (CRT). Separate speaker apparatus 10L, 10R are respectively attached to left and right side walls of the television receiver body 1. In this case, the television receiver body 1 does not incorporate therein a speaker. As shown in FIG. 2, left and right side walls 3L, 3R of the television receiver body 1 include hooks 4 attached thereto and the left and right speaker apparatus 10L, 10R are fixed to the left and right side walls 3L, 3R of the television receiver body 1 by fitting the hooks 4 into apertures 15 bored through the rear walls of the speaker apparatus 10L, 10R. As shown in FIG. 2, on the rear walls of the respective speaker apparatus 10L, 10R are attached terminals 16. The 16 are connected to speaker connection terminals (not shown) of the television receiver body 1 via speaker cords 7. In the example shown in FIG. 1, the television receiver body 1 is placed on a television receiver rack 6.

According to this embodiment, the left and right speaker apparatus 10L, 10R are formed of thin box-shaped housings, respectively. Tweeters 11L, 11R that are speakers designed to reproduce the sound of a high frequency component are disposed on the upper portions of the sides of the housings when the left and right speaker apparatus 10L, 10R are secured to the left and right side walls 3L, 3R of the television receiver body 1

(under the state shown in FIG. 1). The sides will hereinafter be referred to as first sides 10a. Tweeters 12L, 12R are disposed on the lower portions of sides that become front walls when the left and right speaker apparatus 10L, 10R are secured to the left and right side walls 3L, 3R of the television receiver body 1. The sides will hereinafter be referred to as second sides 10b. The tweeters 11L, 11R on the first sides 10a and the tweeters 12L, 12R on the second sides 10b are speaker units which are the same in size and frequency characteristic to reproduce the sound of a high frequency component, for example, 300 Hz or more. Therefore, the sounds of the same frequency characteristic are simultaneously reproduced from the tweeters 11L, 11R of the first sides 10a and the tweeters 12L, 12R of the second sides 10b.

Figure 3:
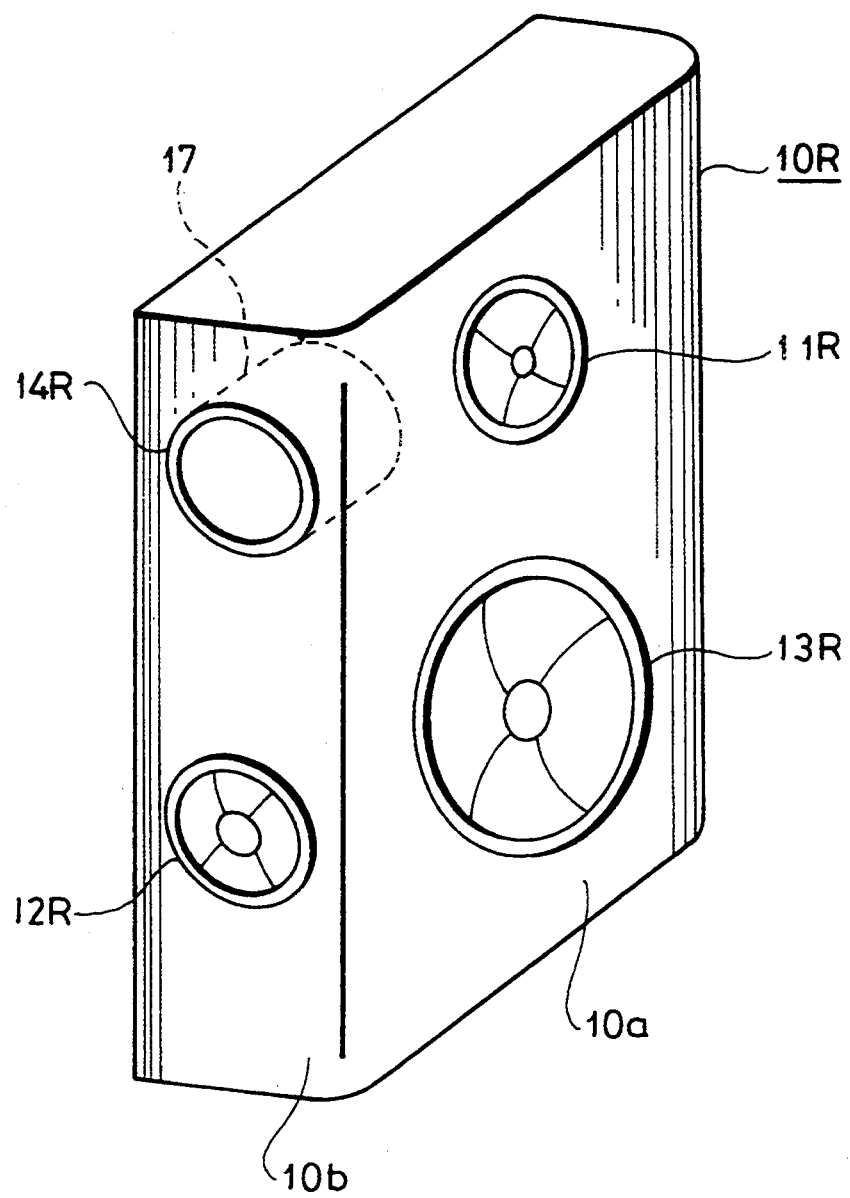
FIG. 3 is a perspective view showing the speaker according to the embodiment of the present invention in an enlarged scale.

Woofers 13L, 13R that are speakers designed to reproduce the sound of a low frequency component are disposed on the lower portions of the first sides 10a. The woofers 13L, 13R are formed of speakers having relatively large diameters to reproduce the sound of a low frequency component, for example, less than 300 Hz. In this case, the woofers 13L, 13R are arranged as so-called bass-reflex speakers to reproduce the sound of a low frequency component. More specifically, through the upper portions of the second sides 10b of the speaker apparatus 10L, 10R are bored through-holes (i.e., ports) 14L, 14R to discharge air within the speaker cabinets to the outside. As shown in FIG. 3, ducts 17 of a predetermined length are connected to the ports 14L, 14R. Since the ducts 17 are connected to the ports 14L, 14R, the woofers 13L, 13R functions as the bass-reflex speakers in which a phase of the sound output from the rear walls of the woofers 13L, 13R are inverted and radiated from the ports 14L, 14R to thereby reproduce the sound of a low frequency component with increased efficiency.

On the first and second sides 10a, 10b of the left and right speaker apparatus 10L, 10R are located protecting members called saran nets or the like. Therefore, the speakers and the ducts shown in FIG. 3 or the like are covered with the protecting members in actual practice and cannot be directly seen from the outside.

In this embodiment, the diameters of the ports 14L, 14R and the diameters of the tweeters 12L, 12R are made substantially equal. Therefore, under the condition that the ducts 17 and the tweeters 12L, 12R are not attached to the housings that construct the speaker cabinets, two through-holes (duct attaching apertures and tweeter attaching apertures) of the same diameter are opened on the second sides 10b of the speaker cabinets. With this arrangement, the speaker cabinet that constructs the speaker apparatus can be made common to the left and right speaker apparatus 10L, 10R.

Positioning of the speaker apparatus 10L, 10R of this embodiment will be described below.

From a standard arrangement standpoint, the speaker apparatus 10L, 10R are directly fixed to the left and right side walls of the television receiver body 1 as shown in FIG. 1. In that case, the image display portion 2 of the television receiver body 1 and the second sides 10b of the left and right speaker apparatus 10L, 10R are aligned so that, while facing the image display portion 2, the viewer is within a range to receive the sound of a high frequency component reproduced from the tweeters 12L, 12R attached to the second sides 10b. Therefore, the sounds reproduced from the left and right speaker apparatus 10L, 10R reach the viewer satisfactorily and thus a sound with excellent presence can be reproduced by a stereo reproduction system, for example. The sound of a low frequency component reproduced by the left and right woofers 13L, 13R has weak directivity so that, even when the left and right woofers 13L, 13R are attached to the side walls of the television receiver body 1, the viewer who faces the image display portion 2 can hear the sound of a low frequency component well. Thus, the viewer can hear a reproduced sound over the whole frequency range in a well-balanced condition.

In the arrangement shown in FIG. 1, since the second sides 10b of short width face the front, the width of the whole television receiver including the speakers can be reduced and the television receiver can therefore be installed in the small space. Further, since the sizes of the woofers 13L, 13R that can be disposed in the respective speaker apparatus 10L, 10R are not influenced by the widths (i.e., widths of the second sides 10b) of the speaker apparatus 10L, 10R, the woofers 13L, 13R having large diameters can be installed to reproduce the sound of low frequency component with impressive tone quality.

Positioning of the speakers apparatus 10L, 10R of this embodiment when the speaker apparatus 10L, 10R are removed from the television receiver body 1 will be described. In this case, the speaker apparatus 10L, 10R may be disposed as, for example, shown in FIG. 4. More specifically, the respective speaker apparatus 10L, 10R are removed from the television receiver body 1 and then the speaker cords that connect the speaker connection terminals of the television receiver body 1 and the terminals 16 of the respective speaker apparatus 10L, 10R are oppositely connected right and left (speaker cords 7 are not shown in FIG. 4), i.e., a right channel audio signal is supplied to the left speaker apparatus 10L and a left channel audio signal is supplied to the right speaker apparatus 10R.

The left speaker apparatus 10L is fixed to the rear right wall surface relative to the television receiver body 1, and the right speaker apparatus 10R is fixed to the rear left wall surface relative to the television receiver body 1. At that time, the speaker apparatus 10L, 10R are disposed such that the first sides 10a of the respective speaker apparatus 10L, 10R face the front. Also, the television receiver body 1 is set on a television receiver rack 6' of a proper size. In this case, the left and right direction is referred to as the direction seen by the viewer facing the image display unit 2 of the television receiver body 1.

With the above-mentioned arrangement, the first sides 10a face the front so that, while facing the image display portion 2, the viewer is within a range to receive the sound of high frequency component reproduced from the tweeters 11L, 11R attached to the first sides 10a. Therefore, also in this case, the viewer can hear the sound reproduced from the left and right speaker apparatus 10L, 10R over the whole frequency range in a well-balanced fashion. Consequently, the sound with excellent presence can be reproduced, for example, by the stereo reproduction system. Further, in this embodiment, since the left and right speaker apparatus 10L, 10R are disposed oppositely right and left, the second sides 10b of the respective speaker apparatus 10R, 10L face the outside distant from the television receiver body 1, whereby the sound reproduced from the tweeters 12L, 12R disposed on the second sides 10b of the two speaker apparatus 10R, 10L is emanated with spatial impression right and left. Thus, a stereo sound with excellent spatial impression can be reproduced.

Figure 4:
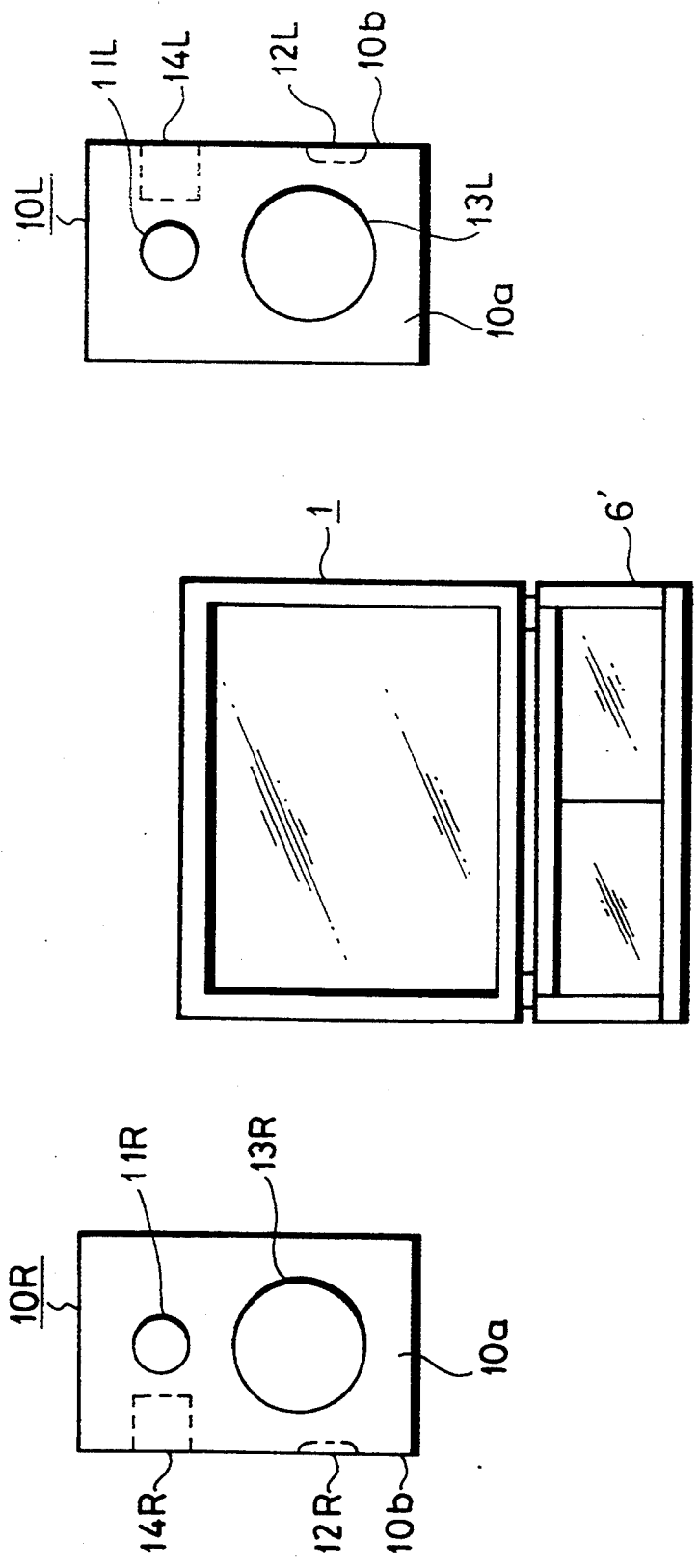
FIG. 4 is a front view showing a first example that the speaker according to the embodiment of the present invention is disposed.

When the speaker apparatus 10L, 10R are disposed as shown in FIG. 4, the following variants are also possible. That is to say, the respective speaker apparatus 10L, 10R are not fixed to the wall surface and may be disposed on predetermined speaker racks 8L, 8R as shown in FIG. 5.

When the respective speaker apparatus 10L, 10R are fixed to the wall surface, as shown in FIG. 6, the left and right speaker apparatus 10L, 10R may be disposed at the positions in the regular direction (i.e., the right speaker apparatus 10R is disposed at the rear right side of the television receiver 1 and the left speaker apparatus 10L is disposed at the rear left side of the television receiver 1). In this case, the speaker connection terminals of the television receiver body 1 and the terminals 16 of the respective speaker apparatus 10L, 10R are connected together by the speaker cords 7 in the regular direction. Thus, the second sides 10b of the speaker apparatus 10L, 10R face the television receiver 1 side so that a sound reproduced from the tweeters 12L, 12R disposed on the second sides 10b is transmitted to the television receiver 1 side. Therefore, a reproduced sound of a relatively high frequency component is concentrated on the picture screen of the television receiver 1 and a sound image of a relatively high frequency component is concentrated on the center side, thereby carrying out the reproduction such that a sound image localization is concentrated on the picture screen. It is frequently observed that some video program to be viewed is reproduced more satisfactorily under such condition.

When the speaker apparatus 10L, 10R of this embodiment are directly attached to the television receiver body 1, the sound can be satisfactorily reproduced in the small space. When the speaker apparatus 10L, 10R are removed from the television receiver body 1 and then disposed as described above, the sound can be reproduced with desired stereo tone quality in response to the positions at which the speakers 10L, 10R are disposed. In any case, the sound can be reproduced satisfactorily.

While the structure for detachably attaching the respective speaker apparatus 10L, 10R to the television receiver body 1 has been described so far by way of example, the present invention is not limited thereto and a variety of connection structures can of course be applied to the present invention. Further, while the sound of a low frequency component is reproduced by the woofers 13L, 13R of bass-reflex type as described above, the present invention is not limited thereto and woofers of enclosure type having no ducts provided therein may be applied to the present invention. In general, bass-reflex type woofers can reproduce the sound of a low frequency component with excellent efficiency even in small speaker cabinets.

While the speaker apparatus of the present invention is a two-way speaker system formed of tweeter and woofer as described above, the present invention is not limited thereto and a three-way speaker system or a speaker having three frequency bands or more may be applied to the present invention.

According to the present invention, the side in which the speaker that can reproduce the sound of a high frequency component is disposed is reduced in width in the lateral direction. If this narrow side faces the front and the speakers are aligned with the television receiver, then the width of the television receiver can be reduced. Also, the speaker that can reproduce a sound of whole frequency range is disposed on the side in which the speaker that can reproduce a sound of low frequency component is disposed together with the speaker that can reproduce a sound of high frequency component. Therefore, if the speaker are removed from the television receiver and disposed in a desired place under the condition that this side faces the front, then the sound can be reproduced with stereo tone quality matched with an image.

In this case, the two speakers that can reproduce the sound of high frequency component have substantially the same frequency characteristics so that, even when the side to which any one speaker that can reproduce the sound of high frequency component is attached is faced to the front, the sound can be reproduced with substantially the same frequency characteristics.

Since the ports required by the bass-reflex speaker is disposed on the side in which only the speaker that can reproduce the sound of high frequency component is disposed, the vacant space of this side can be utilized effectively.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A speaker system for a television receiver, comprising:
   a speaker housing detachable from the body of said television receiver, said detachable speaker housing having a first side and a second side, wherein said second side defines an opening in an upper portion therein;
   a low frequency component speaker disposed in a lower portion of said first side of said detachable speaker housing, said low frequency component speaker having a rear wall;
   two high frequency component speakers, wherein a first of said two high frequency component speakers is disposed in an upper portion of said first side of said detachable speaker housing and a second of said two high frequency component speakers is disposed in a lower portion of said second side of said detachable speaker housing; and,
   a duct connected to said opening and projecting radially inward from said detachable speaker housing, wherein a phase of sound output from said rear wall of said low frequency component speaker is inverted and radiated from said opening.

2. The speaker system of claim 1, wherein the diameter of said opening is substantially equal to the diameter of said high frequency component speaker disposed on said second side.

* * * * *